United States Patent

Shiino et al.

[11] Patent Number: 5,751,776
[45] Date of Patent: May 12, 1998

[54] RECEIVER FOR A DIGITAL COMMUNICATION SYSTEM

[75] Inventors: Haruhiro Shiino; Norio Yamaguchi; Toshimichi Naoi, all of Tokyo, Japan

[73] Assignee: Oki Electric Industry Co., Ltd., Tokyo, Japan

[21] Appl. No.: 736,767

[22] Filed: Oct. 25, 1996

Related U.S. Application Data

[62] Division of Ser. No. 167,967, Dec. 21, 1993, Pat. No. 5,602,881.

[30] Foreign Application Priority Data

Apr. 24, 1992 [JP] Japan ................... 4-106501

[51] Int. Cl.$^6$ ................... H04L 7/02
[52] U.S. Cl. ................... 375/371
[58] Field of Search ................... 375/371, 373, 375/375, 376

[56] References Cited

U.S. PATENT DOCUMENTS

| | | | |
|---|---|---|---|
| 4,873,683 | 10/1989 | Oarth et al. | 370/337 |
| 4,985,900 | 1/1991 | Rhind et al. | 375/371 |
| 5,121,414 | 6/1992 | Levine et al. | 375/343 |
| 5,245,611 | 9/1993 | Ling et al. | 370/347 |

FOREIGN PATENT DOCUMENTS

| | | |
|---|---|---|
| 59-63849 | 4/1984 | Japan . |
| 60-55763 | 4/1985 | Japan . |
| 60-141056 | 7/1985 | Japan . |

OTHER PUBLICATIONS

M. Hata, "Fundamentals and Applications of Digital PLL". *Trikeppus Co., Ltd.*, Extra Series 11, Jul. 4, 1990, pp. 17–22 w/English abstract.

*Primary Examiner*—Stephen Chin
*Assistant Examiner*—Kevin Kim
*Attorney, Agent, or Firm*—Spencer & Frank

[57] ABSTRACT

A receiver to be employed in a digital mobile communication system, more particularly to a receiver for performing complex correlation against a received signal so as to establish and supervise the synchronization with the received signal. The receiver estimates a transmission channel between sending and receiving stations using the received signal and a predetermined reference signal (S11). The phase of the received signal is compensated for using the estimated phase error resulting from the estimation (S12). Complex correlation of the received signal which is compensated for in phase is performed against the reference signal (S13) to obtain a correlation value. The correlation value is compared with a predetermined threshold value (S14). The presence or absence of synchronization between the sending and receiving stations can be detected based on the result of the comparison. In case of detecting synchronization again after the synchronization is once detected, the phase of the received signal is compensated for (S22) using a previously obtained phase variation amount whereby the complex correlation value can be obtained (S23).

4 Claims, 6 Drawing Sheets

RECEIVER FOR A DIGITAL COMMUNICATION SYSTEM

This is a Division of application Ser. No. 08/167,967, filed under 35 USC 371 on Dec. 21,1993, now U.S. Pat. No. 5,602,881 stage application based on international application PCT/JP93/00510, filed on Apr. 20,1993.

BACKGROUND OF THE INVENTION

TECHNICAL FIELD

The present invention relates to a receiver for a digital communication system. More particularly, the invention relates to an apparatus for and a method of compensating for frequency offset of a carrier in a receiver for a digital communication system using complex correlation for establishing and supervising synchronization with a received digital signal and to a phase locked loop suitably employed in the receiver.

BACKGROUND TECHNOLOGY

A variety of communication services which have been realized conventionally by an analog systems are now being changed into a digital systems in view of efficient utilization of frequency, miniaturization of devices and economy. In a TDMA (TIME DIVISION MULTIPLE ACCESS) type digital communication system which is now employed in various countries, communication is performed by receiving and transmitting a data frame between sending and receiving stations. The data frame comprises a plurality of time slots. The receiving station detects a time slot assigned thereto among the time slots of the data frame at the start of a communication which has been transmitted from the sending station and performs synchronization with the detected time slot.

There are two synchronization processes which are described hereinafter. One is a synchronization establishing process to capture the time slot of the received data frame at the start of communication and the other is a synchronization supervising process to supervise the position of the received time slot to thereby compensate for the synchronization after the synchronization is once established to start communication. A reference signal is previously given to the receiver (this reference signal is hereinafter referred to as a synchronous word). The receiving station is required to perform complex correlation between the received signal and the synchronous word to thereby yield a correlation value.

There is a slight difference between a carrier frequency which is transmitted by the sending station and a carrier frequency which is received by the receiving station in a practically operated system (this slight difference is hereinafter referred to as a frequency offset). The phase of the received signal is varied to increase or decrease monotonically due to the frequency offset. As a result, there is a possibility that the computed correlation value is lowered and that the synchronization can not be detected correctly in the receiving station.

Accordingly, the receiving station is required to compensate for the phase variation due to the frequency offset. The receiving station normally controls the carrier frequency of the receiver so as to conform it to the transmitted carrier frequency using an automatic frequency control circuit (AFC). An example of a similar control method without using the AFC is disclosed in U.S. Pat. No. 5,121,414.

However, in a mobile communication system represented by a cellular system, signals are interfered with by obstacles which exist between a base station and a mobile station which causes a multi-path transmission channel—i.e., a so-called multipath fading channel—. In this case, the phase of each vector term of the complex correlation is varied depending on the magnitude, phase, lag, etc. of the interference wave. Accordingly, the mobile station is required to correctly detect and compensate for the frequency offset under such circumstances. This is needed for correctly detecting synchronization and at the same time for keeping the accuracy and stability of the frequency of the carrier transmitted from the mobile station.

SUMMARY OF THE INVENTION

An object of the invention is to provide a receiver for use in a digital communication system, which is capable of detecting and establishing suitable synchronization with a TDMA frame.

Another object of the invention is to provide a receiver capable of suitably compensating for a phase variation which is caused by a frequency offset.

Still another object of the invention is to provide a receiver capable of correctly detecting the complex correlation of the received signal against the carrier to thereby control the frequency of a carrier oscillator in a short time even if the initial frequency offset of the carrier is large.

A further object of the invention is to provide a digital phase locked loop capable of sufficiently attenuating noise even if it is employed in a transmission channel having a considerable amount of noise.

That is, in a receiver for a communication system for transmitting and receiving a digital signal between sending and receiving stations, the receiver of the present invention is characterized in comprising a storing means for storing a reference signal, a complex correlation performing means for performing complex correlation of the received digital signal against the reference signal upon reception of the received digital signal and the reference signal, a transmission channel estimating means for estimating the transmission channel between the sending and receiving stations upon reception of the received digital signal and the reference signal, a phase synchronizing means for estimating the phase of the received digital signal and obtaining a phase variation amount upon reception of the received digital signal and the result of an estimation which is output from the transmission channel estimating means and a phase rotating means for compensating for the phase of the received digital signal upon reception of the phase variation amount.

In a receiver for a communication system for transmitting and receiving a digital signal between sending and receiving stations, the receiver of another aspect of the invention is characterized in comprising a storing means for storing a reference signal, a complex correlation performing means for performing complex correlation of the received digital signal against the reference signal upon reception of the received digital signal and the reference signal, a transmission channel estimating means for estimating the transmission channel between the sending and receiving stations upon reception of the received digital signal and the reference signal, a phase synchronizing means for estimating the phase of the received digital signal and obtaining a phase variation amount upon reception of the received digital signal and the result of an estimation which is output from the transmission channel estimating means, a phase rotating means for compensating for the phase of the received digital signal upon reception of the phase variation amount and a carrier generating means for generating a carrier upon reception of an output of the phase synchronizing means wherein a first loop is formed by the phase synchronizing means and the phase rotating means and a second loop is formed by the phase synchronizing means and the carrier generating means, thereby compensating for the phase of the received digital signal.

A digital phase synchronizing circuit of still another aspect of the invention is characterized in comprising a phase error detecting means for detecting a phase error between input and output signals, a corrected amount outputting means for outputting the corrected amount of the phase error upon reception of an output of the phase error detecting means and a phase correcting means for correcting the phase of the input signal upon reception of an output of the corrected amount outputting means.

BEST MODE FOR CARRYING OUT THE INVENTION

Figure 1:
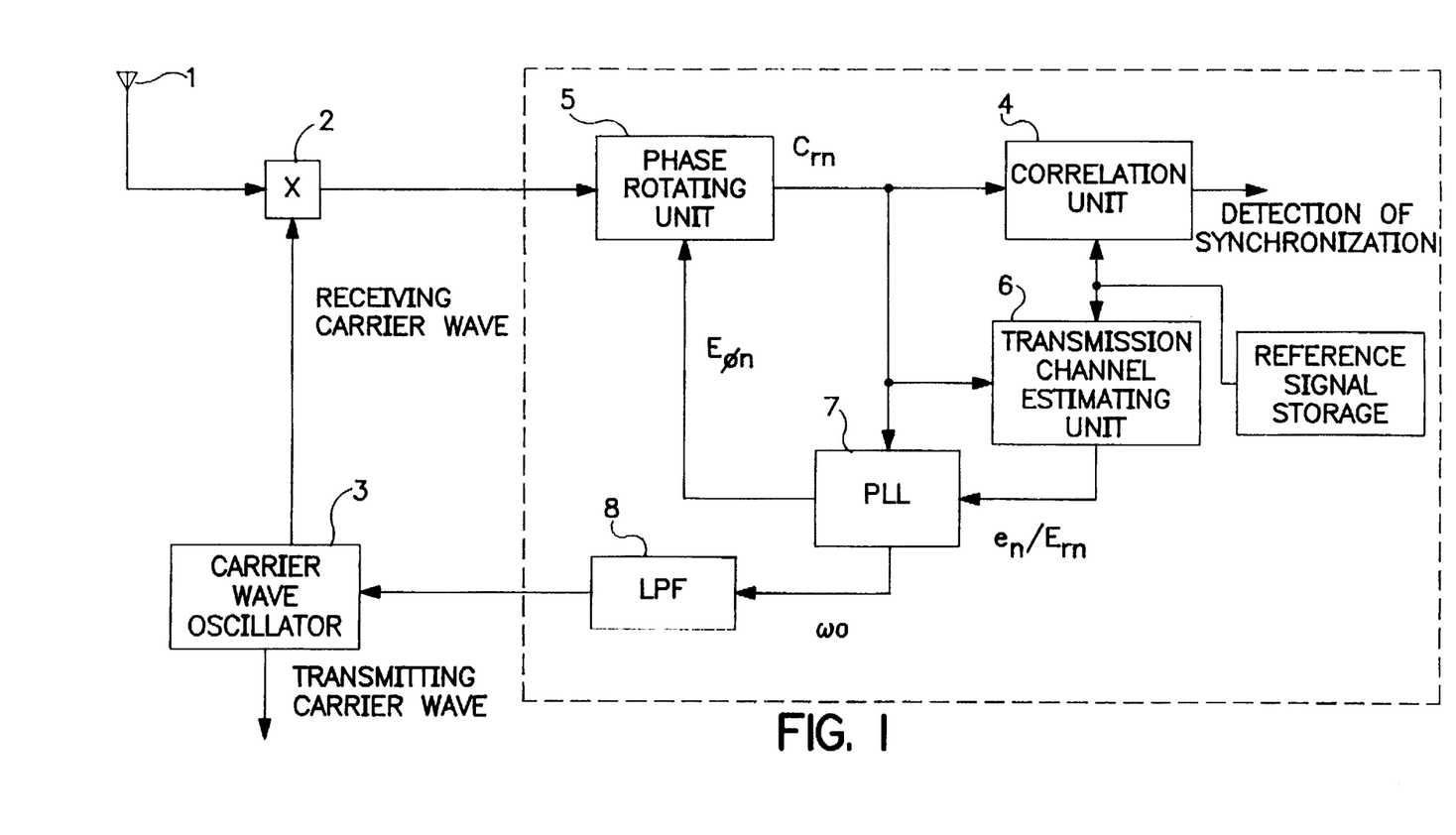
FIG. 1 is a block diagram showing the function of a digital receiver employing the present invention.

The invention is described hereinafter with reference to FIGS. 1 to 6. FIG. 1 is a block diagram of a digital receiver of the invention.

The digital receiver receives, e.g., a 800 MHz high frequency signal which is transmitted from a ground station. The signal is received not shown, by an antenna 1. The received signal is input to a signal converting part 2. A receiving carrier which is supplied from a carrier oscillator 3 is input to the signal converting part 2. The received signal is converted into a digital signal having a base bandwidth by the signal converting part 2.

The carrier oscillator 3 generates receiving and transmitting carriers. The control of the carrier oscillator 3 will be described more in detail later. The digital signal which is output from the signal converting part 2 is input to a phase rotating unit 5 which compensates for the phase of the input digital signal. The output of the phase rotating unit 5 is supplied to a correlation unit 4, a transmission channel estimating unit 6 and a PLL 7.

The correlation unit 4 is a circuit to perform correlation of the received signal which is compensated for in phase by the phase rotating unit 5 against a synchronous word which is previously held by the digital receiver. The output of the phase rotating unit 5 and the synchronous word are supplied to the transmission channel estimating unit 6. The estimation of the transmission channel is performed by the transmission channel estimating unit 6 using an adaptive algorithm. The output of the PLL 7 is input to the phase rotating unit 5 and an LPF 8. The PLL 7 estimates the phase of the received signal. The estimation of the transmission channel by the transmission channel estimating unit 6 and the estimation of the phase of the received signal by the PLL 7 will be described more in detail later.

A correlation performing process in a synchronization establishing process is described hereinafter with reference to FIG. 2.

First, in Step 11, the transmission channel estimating unit 6 and each register or variable of the PLL 7 are reset. Next, in Step 12, the PLL 7 estimates the phase of the received signal based on a signal which is supplied from the phase rotating unit 5. The phase rotating unit 5 compensates for the phase of the received signal based on the result of estimation by the PLL 7. At the same time, the transmission channel estimating unit 6 estimates the transmission channel using the adaptive algorithm. A general RLS (Recursive Least Squares) or LMS (Least Mean Square alorithm) can be employed as the adaptive algorithm used in Step 12. Alternatively, other appropriate algorithms may be employed. The transmission channel is estimated by the transmission channel estimating unit 6 so that the PLL 7 estimates the phase variation amount of the received signal due to the frequency offset. To estimate the transmission channel, the transmission channel estimating unit 6 supplies a signal, for detecting the phase difference or error of the received signal, to the PLL 7.

Supposing that the transmission channel is represented by an FIR model having an impulse response length (L+1), the estimation of the transmission channel is performed by the transmission channel estimating unit 6 using the following expressions (1) to (3).

$$Er_n = \sum_{j=0}^{L} x_{n-j} Eh_j^n \tag{1}$$

$$e_n = Cr_n - Er_n \tag{2}$$

$$Eh_j^{n+1} = Eh_j^n + e_n k_n (j = 0, 1, \ldots, L) \tag{3}$$

where:

$X_n$: synchronous word $Eh_j$: estimated impulse response in a transmission channel $Cr$ is a received signal which is compensated for in phase and is expressed as $Cr_n = r_n \exp[-jE\phi_n]$ supposing that the received signal is $r_n$ and the phase estimated by the PLL 7 is $E\phi_n$.

$k_n$ represents a Karman gain vector in case of the RLS algorithms or it is expressed as $kn = \delta x_n^*$ where $\delta$ is a constant in case of the LMS algorithms. (* represents complex conjugate).

$Er_n$ is an estimated value of the received signal and $e_n$ is an estimated error signal in the transmission channel and is employed for phase error detection by the PLL 7 as expressed in the following expression (4).

The PLL 7 employs a second order PLL for estimating a given phase variation amount due to the frequency offset. This is performed by the following expressions (4) to (7).

$$\Delta\phi_n = I_m[e_n Cr_n^*] = I_m[Er_n^* Cr_n] \tag{4}$$

$$a_{n+1} = a_n + \alpha \cdot \Delta\phi_n \tag{5}$$

$$\Delta E\phi_{n+1} = a_{n+1} + \beta \cdot \Delta\phi_n \tag{6}$$

$$E\phi_{n+1} = E\phi_n + \Delta E\phi_{n+1} \tag{7}$$

where:

$I_m[\ ]$ represents an imaginary part.

$\alpha$ and $\beta$: coefficients for determining PLL characteristics.

The control of the coefficients $\alpha$ and $\beta$ will be described more in detail later.

Computations of the expressions (1) to (7) are performed for a first symbol of the received signal. The same computations of the expressions (1) to (7) are performed for a succeeding symbol of the received signal. Likewise, these computations are iteratively performed N times until N symbols of the received signal come (N is the number of bits of the synchronous word or the number of symbols). The estimation of the transmission channel is performed by the transmission channel estimating unit 6 upon completion of the N times computations.

Described hereinafter is the estimation of the phase of the received signal by the PLL 7. The transmission channel estimating unit 6 integrates the phase error $\Delta\phi_n$ to thereby compute a dc component, i.e., the constant variation component of phase ($a_n$ is hereinafter referred to as a phase error integrator value). That is, in performing the complex correlation, the expression of $a_n = a_N$ (at the time when the N times iterative computations of the expressions (1) to (7) are completed, i.e., at the time of completion of the estimation of the transmission channel) equals to the constant phase variation amount $\omega_0 T$ due to the frequency offset. This becomes the value of the phase variation amount estimated by the PLL 7. The phase rotating unit 5 compensates for the phase of the received signal upon reception of this estimated value.

The phase rotating unit 5 rotates the phase of the received signal by the phase variation amount which is supplied from the PLL 7 so as to compensate for the phase of the received signal. The received signal which is compensated for in phase is input to the correlation performing unit 4.

The correlation process goes to a step S13. In this step, the complex correlation of the received signal which is compensated for in phase in step S12 is performed against the synchronous word so as to obtain a correlation value. The correlation value of the received signal against the synchronous word which is thus obtained by the correlation performing unit 4 is compared with a predetermined threshold value in step S14. If the correlation value exceeds the threshold value as a result of a comparison in step S14, the correlation performing process is completed, judging that synchronization of the received signal with the carrier is detected.

If the correlation value is less than the threshold value, the process returns to the step S11, judging that synchronization is not detected. In this case, the same process is performed for each of N symbols in which the received signal symbols are shifted backward by one symbol. That is, the computations of the expressions (1) to (7), estimation of the transmission channel, estimation of the phase and compensation for the phase error are performed for the received signal ranging from a second symbol to an (N+1) symbol, and then the correlation value is computed. Likewise, the complex correlation is iteratively performed successively until the correlation value exceeds the threshold value.

As is evident from the above, the phase variation amount to be given to the phase rotating unit 5 by this process corresponds to a phase variation amount per symbol due to the frequency offset. As a result, the phase of the received signal is varied at a given rate so that the compensation for the phase is performed for each symbol of the receive signal.

Figure 2:
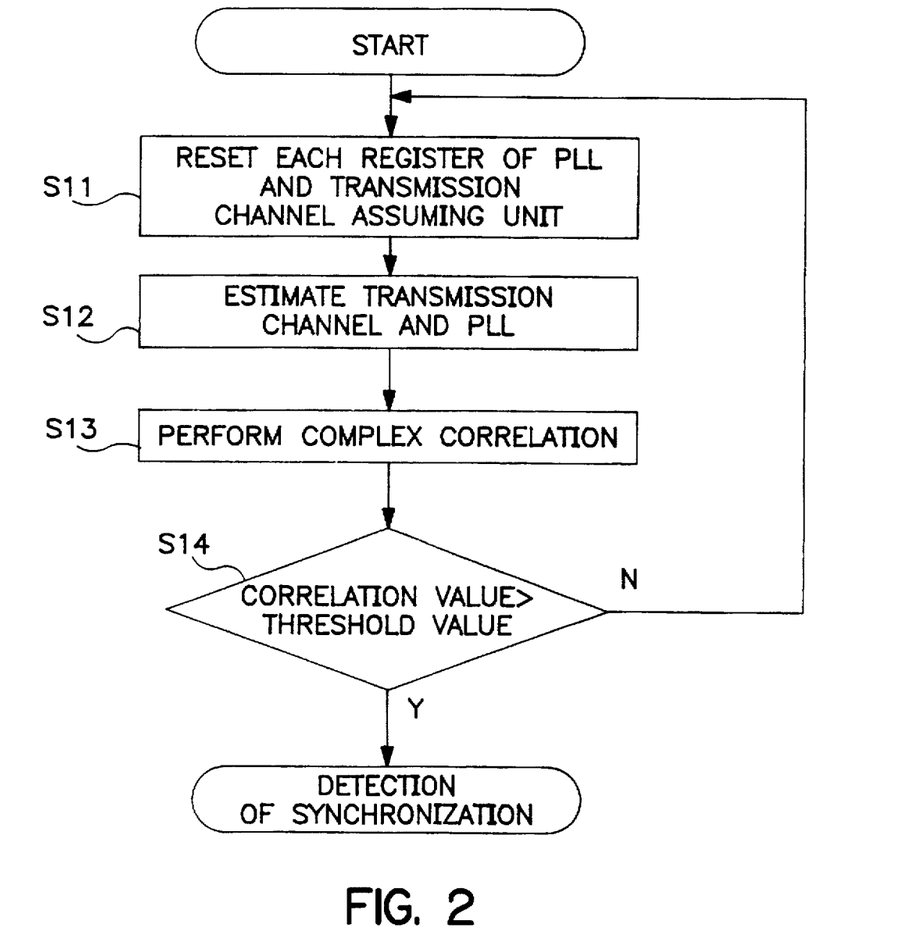
FIG. 2 is a flow chart showing a correlation process applied to the present invention.

The synchronization of the received signal with the synchronous word is detected upon completion of the processes as illustrated in FIG. 2. In the receiver generally applied to the TDMA system, it is considered that synchronization between the transmitter and the receiver is established when the synchronization of the received signal with the synchronous word is detected plural times but not one time. Accordingly, it is necessary to further iterate the synchronization detecting process.

Figure 3:
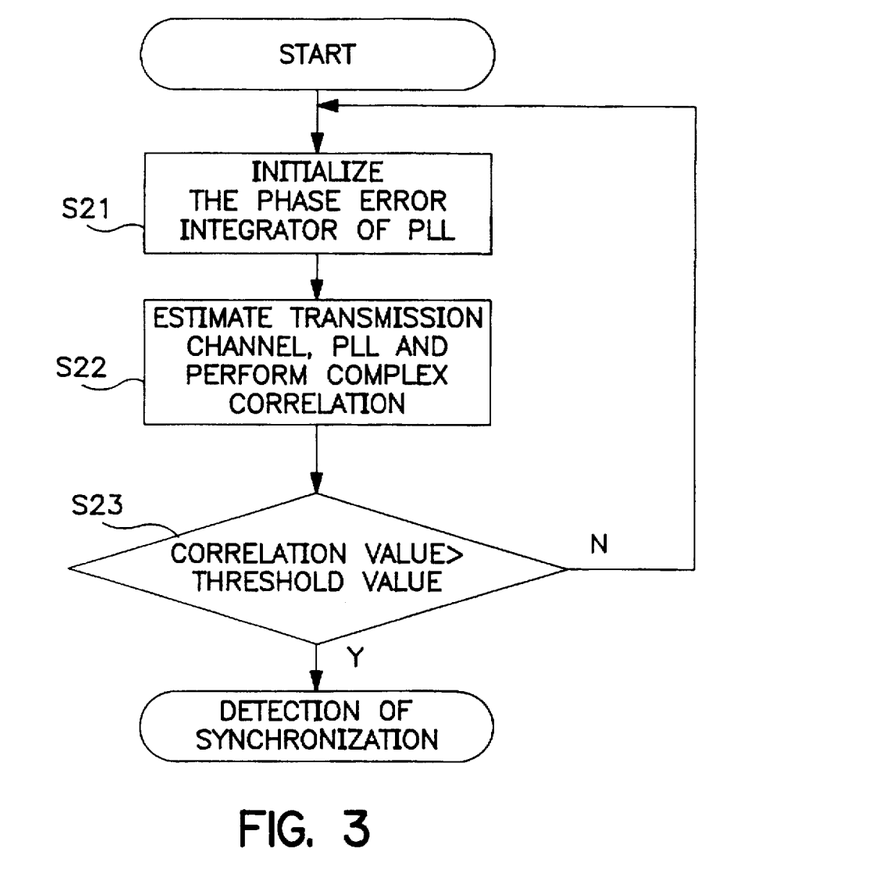
FIG. 3 is a flow chart showing another correlation process applied to the present invention.

FIG. 3 is a flow chart showing another example of the correlation performing process of the invention. In case of iteratively continuously performing the synchronization detecting process in the synchronization establishing process, this correlation performing process according to this embodiment can be applied to the processes of the second and succeeding times.

A value $a_N$ which is output from the phase error integrator at the time when the synchronization of the received signal with the synchronous word is detected represents an estimated value which substantially approximates to the phase variation amount $\omega_0 T$ due to the frequency offset except when the synchronization is detected in error. Accordingly, the phase error integrator of the PLL 7 is initialized to thereby reset other registers or variables at first in step S21 in a flowchart illustrated in FIG. 3. The value of $a_N$ at the time of completion of the previous correlation performing process or the average of the values of $a_N$ which has been obtained until the previous synchronization detecting process is given to the phase error integrator. That is, the computation is not iterated with regard to every symbol of the received signal but the already obtained value is used in this step.

In step S22, there are performed at the same time the estimation of the transmission channel by the transmission channel estimating unit 6, estimation of the phase of the received signal by the PLL 7 and computation of the correlation value by the correlation unit 4. In step S23, the correlation value is compared with the threshold value to thereby determine whether the synchronization of the received signal with the synchronous word is established or not. The judgment to be made in step 23 is the same as the judgment described with reference to FIG. 2. The performance of such processes dispenses with the iterative computation for every symbol of the received signal. Accordingly, the overhead for the iterative computation and the number of processes performed by the phase rotating unit are reduced, which leads to a reduction of the total amount of computation.

The control of the carrier oscillator 3 is described hereinafter. It is not clear in what part of the received signal the time slot is present in the first synchronization detection in the synchronization establishing process. Accordingly, the complex correlation against the synchronous word must be performed for all the symbols of the received signal according to the flow chart as illustrated in FIG. 2. If the synchronization is detected as a result of the complex correlation performance, a succeeding slot is to be detected when a period for one frame lapses after the time when the synchronization was first detected. Under the premise, this complex correlation performing process is iterated according to the flow chart as illustrated in FIG. 3 for the received signal alone particularly in the time zone around this time among the received signals. As a result, it is considered that the synchronization is established between the transmitter and the receiver if the synchronization times are detected at predetermined intervals. At this time, the average value of the frequency offset $\omega_0$ which is estimated by the PLL 7 every plural times of detection of the synchronization, is supplied to the carrier oscillator 3. The carrier oscillator 3 starts to control the received carrier based on the average value of the frequency offset $\omega_0$.

After the completion of establishment of the synchronization, the LPF 8 filters the estimated value of the frequency offset $\omega_0$ which is output from the PLL 7 and inputs it to the carrier oscillator 3 so as to control the carrier oscillator 3. In such a manner, there is formed a loop by the PLL 7, LPF 8, the carrier oscillator 3 and the signal converting part 2 for controlling the frequency offset of the receive signal. At or after this point of time, the receiver stops the synchronization establishing process and starts to perform the synchronization supervising process. The synchronization supervising process will be described in detail later.

Figure 4:
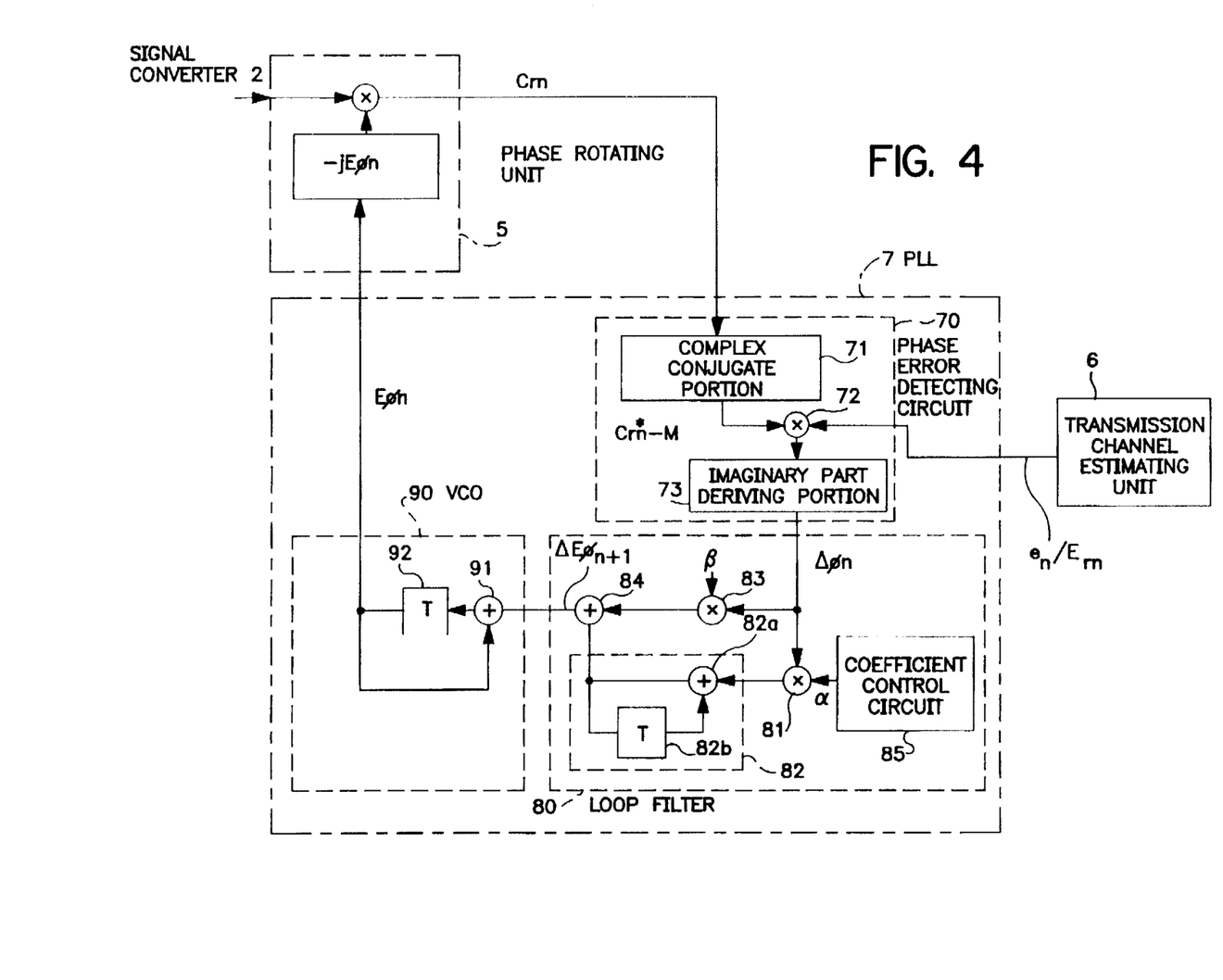
FIG. 4 is a block diagram of a digital phase locked loop applied to the present invention.

Described hereinafter is the control of the coefficients $\alpha$ and $\beta$ for determining the characteristics of the PLL 7. FIG. 4 is a detailed circuit diagram of the phase rotating unit 5 and PLL 7.

The received signal is compensated in phase by the phase rotating unit 5 and is input to a phase error detecting circuit 70. The phase error detecting circuit 70 includes a complex conjugate portion 71, a multiplier 72 and an imaginary part deriving portion 73. The received signal which is input to the phase error detecting circuit 70 is input to the multiplier 72 by way of the complex conjugate portion 71. The multiplier 72 also receives the estimated error signal $e_n$ from the transmission channel estimating unit 6. A multiple of the received signal and the estimated error signal $e_n$ is supplied to the imaginary part deriving portion 73. The output of the imaginary part deriving portion 73 becomes a phase error $\Delta\phi_n$ between the phase $\phi_n$ of the received signal and the phase $E\phi_n$ of a regenerative carrier. The phase error $\Delta\phi_n$ is supplied to a loop filter 80. There is also conceived a structure that the received signal is directly input to the multiplier 72, not by way of the complex conjugate portion 71. In this case, a signal to be input from the transmission channel estimating unit 6 to the multiplier 72 is the estimated value $Er_n$ instead of the estimated error signal $e_n$, more particularly the complex conjugate of the estimated value $Er_n$ is input to the multiplier 72. As is evident from the expression (4), the signal having the complex conjugate is merely varied so that the output of the phase error detecting circuit 70 is the phase error $\Delta\phi_n$.

The loop filter 80 comprises a first multiplier 81 for multiplying the phase error $\Delta\phi_n$ by the first coefficient $\alpha$, an integrator 82 for integrating the output of the first multiplier 81, a second multiplier 83 for multiplying the phase error $\Delta\phi_n$ by the second coefficient $\beta$ and an adder 84 for adding the output of the second multiplier 83 to the output of the integrator 82. The integrator 82 totals the output of the first multiplier 81 by an adder 82a and a register 82b to thereby obtain a D.C. component of the phase error $\Delta\phi_n$. Upon completion of the estimation of the transmission channel by the transmission channel estimating unit 6, the register 82b accumulates therein the phase variation amount $\omega T$ to be supplied to the phase rotating unit 5. An instantaneous value of the phase error $\Delta\phi_n$ is obtained by the second multiplier 83. The adder 84 adds the output of the integrator 82 to the output of the second multiplier 83 to thereby produce a phase correction amount $\Delta E\phi_{n+1}$ of the regenerative carrier.

The phase correction amount $\Delta E\phi_{n+1}$ is input to an adder 91 which is included in a VCO 90. The adder 91 adds the input phase correction amount $\Delta\phi E_{n+1}$ to the phase $E\phi_n$ of the regenerative carrier which is held by a register 92. The content of the register 92 is output as the phase $E\phi_{n+1}$ of a regenerative carrier of next time and is fed back to the phase rotating unit 5.

The characteristics of the phase locked loop having the arrangement set forth above are described hereinafter.

Supposing that z transform of the phases $\phi_n$ and $E\phi_n$ of the received signal and the regenerative carrier in FIG. 4 are $\Phi(z)$ and $E\Phi(z)$. The transfer function of the phase locked loop is expressed by the following Expression 8.

$$E\Phi(z)\alpha+\beta-\beta z^{-1} \quad \Phi(z)1-(2-\alpha-\beta)z^{-1}+(1-\beta)z^{-2} \qquad (8)$$

Figure 5:
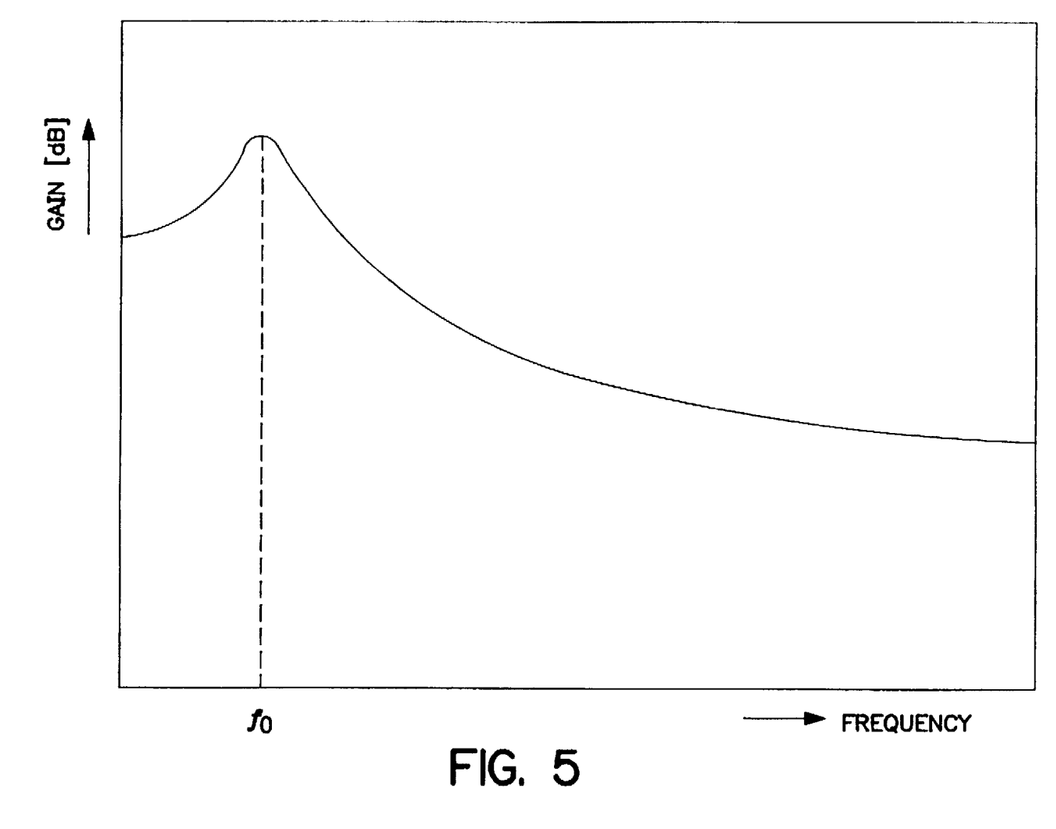
FIG. 5 is a view exemplifying a frequency characteristic of the digital phase locked loop of FIG. 4.

FIG. 5 shows an example of the frequency characteristics of the expression (8), wherein a peak frequency $f_o$ is obtained by expression (8) as follows:

$$f_0 = \frac{1}{2\pi T} \cos\left( \frac{2-\alpha-\beta}{2\sqrt{1-\beta}} \right) \qquad (9)$$

where T is an operation period of the phase locked loop.

From expression (9), it will be understood that the less the value of the coefficient $\alpha$ is, the narrower the filter bandwidth becomes if the value of the coefficient $\beta$ is fixed. In other word, if the value of the coefficient $\alpha$ is greater, the response is quicker while if the value of the coefficient $\alpha$ is smaller, the degree of attenuation of the noise component of the phase error is greater. In the digital phase locked loop of the invention, these coefficients $\alpha$ and $\beta$ are supplied to the first and second multipliers 81 and 83 respectively. That is, the characteristics of the loop filter 80 are determined by the values of the coefficients $\alpha$ and $\beta$.

The operation of the phase locked loop is described hereinafter.

In the digital phase locked loop, the noise component of the output phase and a the converging speed of the phase error have a trade off relation. Accordingly, where the characteristics of the loop filter 80 are set to a narrow bandwidth, the effect to attenuate the noise is increased but it takes a long time until the phase locked loop is converges. Particularly, if the initial phase error between the input signal and the initial phase error of the regenerative carrier derived from the received signal is large, it takes a long time until the phase locked loop is converges, whereby there is a possibility of generating the problem that the signal is not demodulated correctly. However, the synchronous word of the digital cellular system normally has relatively few symbols so that the receiver must converge the phase locked loop within a short time.

To meet this requirement, it is well known that in the earlier stage of synchronization, the characteristics of the loop filter 80 are set to be a wide bandwidth and are switched thereafter to a small bandwidth. However, in a transmission channel having a large amount of noise, such as a digital mobile communication, the noise is not attenuated much if the filter characteristics are set to be large bandwidth. Accordingly, there is a possibility that the demodulated signal error may be enlarged, which results in obtaining insufficient characteristics. To solve this problem, it is possible to converge the phase locked loop within a short period of time from the state where the initial phase error is large to a constant operation state while the noise is attenuated during the converging time by using the method of the conversion according to the invention.

That is, the value of the coefficient $\alpha$ is varied according to the following process while the coefficient $\beta$ is fixed as described above. The loop filter 80 comprises a coefficient control circuit 85 for performing this control.

Firstly, the value of the coefficient $\alpha$ is set to an initial value to thereby operate the digital phase locked loop. Secondly, the value of the coefficient $\alpha$ is gradually reduced toward a convergent value every time a given time period elapses. Finally, the value of the coefficient $\alpha$ is fixed to the convergent value. The initial value of the coefficient $\alpha$ is set to be sufficiently large that the loop filter 80 has a sufficiently large bandwidth so as to adjust the phase of the regenerative carrier in a short time even if the initial phase error between the input received signal and the regenerative carrier is large. The convergent value is set to be sufficiently small that the loop filter 80 has a sufficiently narrow bandwidth in order to sufficiently attenuate the noise of the phase error during the constant operation time even in a transmission channel having a large amount of noise.

Figure 6:
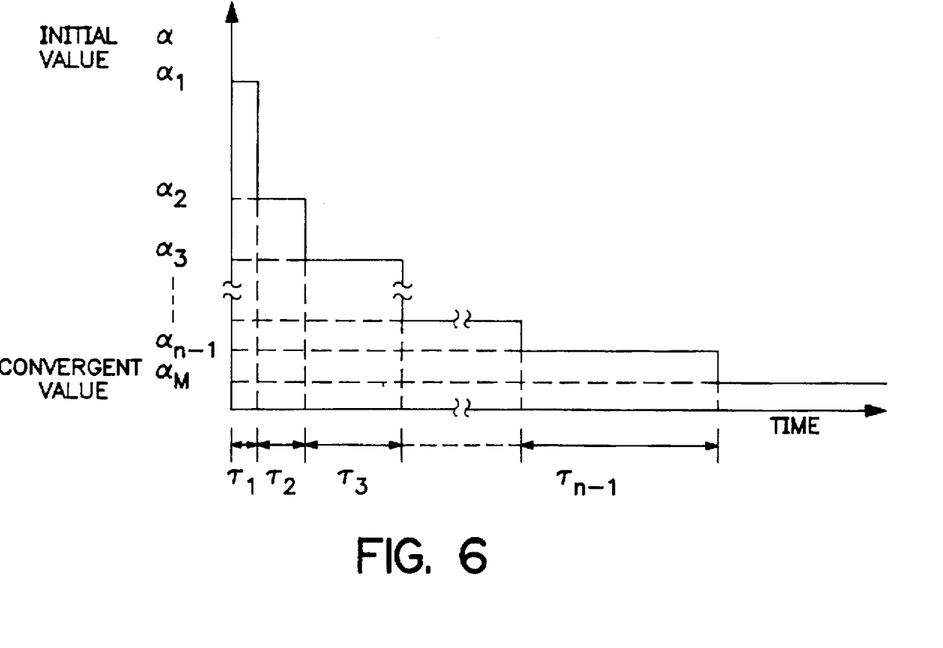
FIG. 6 is a view showing a method of controlling the coefficient of the digital phase locked loop of FIG. 4.

A concrete control method for use by the coefficient control circuit 85 to control α of the coefficient is described with reference to FIG. 6. In the same figure, the relationship $\alpha_{i-1} > \alpha_i$ (i =2, 3, . . . ., M) is employed, where $\alpha_1$ represents an initial value and $\alpha_M$ represents a convergent value. $\tau_i$ represents an operating time at the coefficient $\alpha_i$ and the relationship $\tau_i <\tau_i$ is employed. When the coefficient α is reduced, the filter bandwidth is narrowed but on the contrary the convergent time is lengthened. Accordingly, the operating time at the coefficient value is controlled to be longer than the operating time at the previous coefficient value in order to sufficiently attenuate the phase error caused by the noise component in the transmission channel at the previous coefficient as the coefficient α is lessened as illustrated in FIG. 6. The phase locked loop can be achieved by an independent circuit employing an integrated circuit, etc., or by a process under program control.

Finally that operation of the digital receiver after being switched to a telephonic communication will be described finally. In a synchronization supervising process, the frequency offset is controlled by the loop comprising the PLL7, LPF8, the carrier oscillator 3 and the signal input part 2 every one frame of the received signal. Together with the loop as mentioned immediately before, the loop comprising the PLL7 and phase rotating unit 5 controls the frequency offset with regard to every one symbol of the received signal.

The correlation process employed in this situation is carried out in the same way as that illustrated in FIG. 2. However, in this case, the initial value of the phase error integrator is set to zero. It is desirable that the coefficient α of the PLL 7 be fixed to a small convergent value so as to reduce the influence by the noise. In this process, the frequency offset is reduced by the control of the carrier oscillator at the time of establishing synchronization. Accordingly, the time involved in the convergence of the PLL is shorter than that in the synchronization establishing process. Accordingly, the control in this process is mainly for controlling the noise.

As described in detail above, the control of the carrier oscillator 3 in the synchronization supervising process contributes not only to the stabilization of the frequency of the received carrier and but also to permitting of the frequency of the transmitted carrier to accurately hold at a prescribed accuracy.

The present invention is exemplified by a receiver adapted for the digital cellular system but it is possible to be adapted to any systems employing a reference signal for detecting synchronization. Although the present invention has omitted to explain the functions of an AGC for holding the level of the received signal to an optimum level, an A/D converter, a D/A converter, etc., which are provided in an ordinary digital receiver, it is a matter of fact that the present invention is applied to a receiver having these functions.

The present invention is not limited to the arrangement of the digital phase locked loop and the coefficient control by the phase locked loop as set forth above but can be applied more widely, e.g. to other apparatus employing a digital phase locked loop.

We claim:

1. A digital phase synchronizing circuit, comprising:
a phase error detecting means for detecting a phase error between first and second signals, the phase error detecting means producing an output indicative of the phase error;
a phase error correcting amount outputting means for producing an output indicative of a phase error correcting amount upon reception of the output of the phase error detecting means; and
a means for correcting the phase of the first signal upon reception of the output of the phase error correcting amount outputting means,
wherein the phase error correcting amount outputting means includes
a means for receiving a first coefficient to thereby obtain a dc component of the phase error, and
a means for receiving a second coefficient to thereby obtain the instantaneous value of the phase error, and
wherein an initial value having a predetermined value as a first coefficient and a convergent value having a value which is less than the initial value are set and wherein the first coefficient value is controlled so as to be gradually lessened from the initial value to reach the convergent value after the lapse of a predetermined time.

2. A digital phase synchronizing circuit as claimed in claim 1, wherein an operation time when the digital phase synchronizing circuit operates at the first coefficient value is longer than an operation time when the digital phase synchronizing circuit operates at the coefficient value immediately before the first coefficient value as the first coefficient value becomes sequentially smaller.

3. A digital phase synchronizing circuit comprising a phase error detecting means for detecting a Phase error between first and second signals and for producing an output indicative of the phase error, a first multiplier for providing a first multiplier output by multiplying the phase error by a first coefficient, an integrator for providing an integrator output by integrating the first multiplier output, a second multiplier for providing a second multiplier output by multiplying the phase error by a second coefficient, an adder for providing an adder output by adding the second multiplier output by the integrator output, and a filter means including an accumulator for accumulating the adder output to provide an accumulation result which influences the phase of the first signal;
wherein an initial value having a predetermined value as the first coefficient and a convergent value having value which is less than the initial value are set, and wherein the first coefficient value is controlled so as to be gradually lessened from the initial value to reach the convergent value after the lapse of a predetermined time.

4. A digital phase synchronizing circuit as claimed in claim 3, wherein an operation time when the digital phase synchronizing circuit operates at the first coefficient value is longer than an operation time when the digital phase synchronizing circuit operates at the coefficient value immediately before the first coefficient value as the first coefficient value becomes sequentially smaller.

* * * * *